United States Patent [19]

Bicknese et al.

[11] Patent Number: 5,552,946
[45] Date of Patent: Sep. 3, 1996

[54] COMPLIANT RAIL FOR SHOCK PROTECTION OF A PCMCIA DASD

[75] Inventors: Bryan W. Bicknese, Rochester; Jeffrey F. Boigenzahn, Pine Island; Randy J. Bornhorst, Rochester; Jerome T. Coffey, Rochester; Todd P. Fracek, Rochester; Douglas W. Johnson, Rochester; Richard E. Lagergren, Rochester; James M. Rigotti, Rochester; Marvin A. Schlimmer, Rochester, all of Minn.

[73] Assignee: International Business Machines Corporation, Armonk, N.Y.

[21] Appl. No.: 316,696

[22] Filed: Sep. 30, 1994

[51] Int. Cl.$^6$ ..................................... G11B 33/08
[52] U.S. Cl. ..................... 360/97.01; 361/685
[58] Field of Search ............... 360/97.01, 98.01, 360/99.06; 369/75.1, 77.1, 77.2; 248/634; 312/223.1, 223.2, 334.1, 334.7, 334.8, 334.16; 361/683, 685, 737

[56] References Cited

U.S. PATENT DOCUMENTS

| | | | |
|---|---|---|---|
| 4,150,406 | 4/1979 | Stollorz | 360/97 |
| 4,384,750 | 5/1983 | Hager | 312/8 |
| 4,713,714 | 12/1987 | Gatti et al. | 360/97.01 |
| 4,896,777 | 1/1990 | Lewis | 211/41 |
| 5,045,960 | 9/1991 | Eding | 360/97.01 |
| 5,149,048 | 9/1992 | Morehouse et al. | 248/634 |
| 5,216,582 | 6/1993 | Russell et al. | 312/223.2 |

FOREIGN PATENT DOCUMENTS

| | | | |
|---|---|---|---|
| 569593A1 | 10/1992 | European Pat. Off. | |
| 383281 | 4/1991 | Japan | 360/97.02 |
| 3240299 | 10/1991 | Japan | 361/685 |
| 3260980 | 11/1991 | Japan | 360/137 |
| 4349288 | 12/1992 | Japan | 360/137 |
| 5135561 | 6/1993 | Japan | 360/137 |

Primary Examiner—Stuart S. Levy
Assistant Examiner—William R. Korzuch
Attorney, Agent, or Firm—Laurence R. Letson; Lee R. Osman

[57] ABSTRACT

A resilient and compliant shock rail is provided on the sides of the bottom cover for a PCMCIA standard Direct Access Storage Device. The shock rails, being of a resilient and easily deformable material, lengthen the impact time and attenuates the shock forces exerted on the DASD, thereby bringing the deceleration forces to acceptable levels. The shock rail may be further provided with low friction surfaces by bonding thin metal plates to the top and bottom surfaces of the shock rails to ease insertion and withdrawal of the PCMCIA DASD. The shock rail is provided with reinforcing members to insure that the keying scheme required for proper insertion is effective.

16 Claims, 3 Drawing Sheets

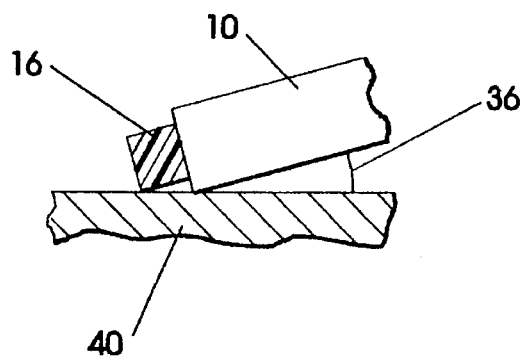
FIG. 2
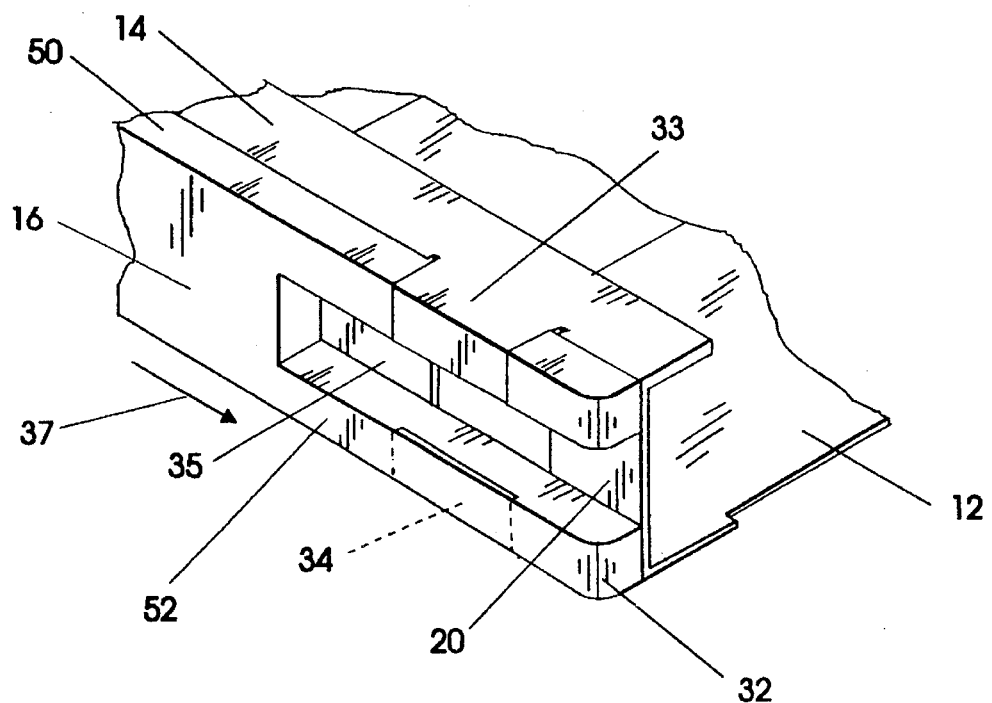
FIG. 3
FIG. 4

COMPLIANT RAIL FOR SHOCK PROTECTION OF A PCMCIA DASD

BACKGROUND OF THE INVENTION

1. Field of the Invention

This invention relates to the shock mounting of a Direct Access Storage Device and to the use of resilient shock rails to cushion cornets of a Direct Access Storage Device.

2. Description of the Related Art

Personal Computer Memory Card International Association (PCMCIA) standard Direct Access Storage Devices (DASD) are insertable into slots in computers, particularly laptop and notebook computers, where size of the components is a very significant design factor. PCMCIA standard handling specifications require that products (including disk drives) be able to withstand drops onto very hard surfaces. This drop converts a significant amount of potential energy into kinetic energy. Accordingly, due to the reduced size of the disk drive, the PCMCIA DASD is more delicate and may be more susceptible to damage upon impact. The abrupt stop upon impact converts the kinetic energy into very high deceleration forces which may exceed the forces which the PCMCIA DASD components may accommodate.

The rigid structure of the DASD necessary to meet the bending and twisting requirements of the PCMCIA specifications in combination with the relatively hard surface of a vinyl clad cement floor results in a very short duration impact. Very short duration impacts result in deceleration which can exceed the critical acceleration levels for some of the components of the DASD.

Improvement both in the handling characteristics of the device and reduction of the possibility of damage due to impact, will result from either increasing the sturdiness of the internal components, or by reducing the deceleration forces during impact to a point below critical acceleration levels for the components of the DASD. Increasing the sturdiness or the fragility levels of the internal components in some cases is thwarted by the fact that the size of the devices has been reduced to the point wherein maintaining significant strength within some components is no longer possible. An alternative approach to provide shock protection by reducing the deceleration to less than the critical deceleration levels is possible notwithstanding the reduction in size of the devices.

The use of the DASD in laptop and notebook size computers suggests a high probability of DASD impacts as a result of being dropped. The impacts also can partially result from any rough handling of the computer device itself. Additionally, the impact forces could come from dropping the disk drive itself at a time when the DASD is not installed in the computer housing.

Rigid mounting of the DASD within the PCMCIA slot of a computer will pass any impact forces from rough handling of the computer to the internal components of the DASD. Further, dropping the DASD on the floor or other hard surface when the DASD is removed from the computer also will transmit impact forces to the internal components of the DASD.

In both cases, the dropping of the DASD on a hard surface and transmitting impact forces from the computer to the DASD, the cushioning of the DASD at the corners will effectively lengthen the duration of the impact and thus spread over a longer period of time the deceleration necessary to stop the DASD, thereby reducing the deceleration levels. For the PCMCIA Type II form factor, it has been found that the rail corners can protect the drive for approximately 70% of the primary impacts. Because of height constraints which prohibit the padding of the major flat surfaces of the DASD, a 100% protection scheme may not be practical or possible in the PCMCIA Type II form a factor. In laptop or notebook computers, height is a very critical consideration; therefore, a significant shock attenuation pad may not be added to the DASD in such a way as to increase its height correspondingly.

Inasmuch as cushioning at the corners provides a significant amount of impact protection, whenever complete shock attenuation is not possible, corner cushioning becomes the best alternative. In order to be sufficiently shock absorptive, any cushioning material must be highly deformative. The amount of protection afforded by the cushioning will be dependent upon the durometer of the shock absorbing material among other factors; a low durometer material will absorb more force but presents offsetting problems.

An additional requirement of the PCMCIA specification is that the rails be formed to accept keys located in the guide slots of the mating DASD connection, resident within the laptop or notebook computer. The keys, projections within the guide slots, prevent incorrect insertion and connection of the DASD with the connectors within the computer. A use of highly deform able materials in the regions of the corners of the DASD to absorb the impact forces permits deformation of the regions for the keying of the DASD rails required by the PCMCIA specification. Without the keying slots, or if the keying slots are not adequately rigid, the DASD can be forcibly jammed into the mounting guide slots possibly damaging the DASD and/or its connectors. It can be seen that in gaining the advantages of shock mounting, the keying arrangement may be compromised.

OBJECTS OF THE INVENTION

It is an object of the invention to provide reinforcement to the keying regions of the deformable shock rails of disk drives.

It is another object of the invention to maintain the keying function while shock mounting the corners of the DASD.

It is a further object of the invention to reduce insertion and removal forces by shielding the highly resilient and high coefficient of friction material of the rail from surface engagement with the guide slot surfaces.

It is still another object of the invention to provide smooth low friction surfaces on the resilient rails for the insertion friction reduction.

Shortcomings of the prior art are overcome, and the objects of the invention are accomplished by the present invention.

SUMMARY OF THE INVENTION

A PCMCIA DASD is provided with rails for engaging guiding and supporting the DASD within guide slots in the housing of the computer. The rails are formed from a very resilient elastomeric material, such as urethane. The resilient shock absorbing rail is attached to the side of the DASD, and extends the length of the DASD housing. The rails, formed as a rib on the side of the DASD, extend to the end of the surface to which they are attached in order to provide as much corner impact protection as possible.

To overcome the degradation of the keying feature required to insure proper insertion of the DASD into the DASD slot of the computer, a portion of the sheet metal material of the bottom cover is formed into reinforcing tabs which extend from the surface supporting the shock rail; these tabs are bent or formed to define a gap or slot through which the key may pass. While the end of the resilient shock rail may be deformed by an improper insertion of the DASD into the DASD slot of the computer and engagement with the keys, the reinforcing members have planes orthogonal to the key and parallel to the direction of insertion and will not deform when subjected to forces sufficient to deform the rail and damage the DASD connectors.

The shock rails act to absorb the force transmitted to the DASD from the computer when roughly handled. More importantly, the shock rails absorb some of the impact whenever the DASD is dropped, and the impact forces passed to the component thereby are reduced to less than critical levels.

Whenever soft resilient elastic material, such as urethane, is formed to function as shock absorbing rails on the cover of the DASD, the prerequisite shock absorption requirements are met to the greatest extent possible; nevertheless, due to the nature of the materials available, the coefficient of friction of the shock rail surfaces is very high, and these rails may not slide easily within the guide slots of the PCMCIA DASD slot in the computer. The lamination of the rail within and between two low friction smooth surfaces will permit, or enhance, movement of the resilient rail along the guide slots in the DASD slot of the computer. The smooth, hard surfaces may be constructed of thin sheets of metal, or may be thin sheets of relatively hard plastics. The lamination will stiffen the rail structure some, but the shock absorption characteristics of the rail will not be significantly degraded or defeated. The protection of the corners of the DASD will continue due to the sheer forces of the rail/cover interface upon impact of the resilient rail with a solid surface.

With reduced frictional resistance to insertion, the insertion forces may be maintained well below the level necessary to defeat the reinforcing members, formed as a portion of the DASD cover. The resilient material of the rail, when molded, may partially encapsulate the reinforcing member, thus presenting the resilient material as the primary contact surface upon impact.

A more complete understanding of the apparatus may be acquired by referring to the attached drawings and the detailed description of the invention to follow.

BRIEF DESCRIPTION OF THE DRAWING

FIG. 2 illustrates a diagram of a DASD dropped onto a hard surface, and the orientation of the DASD which illustrates the division between the protected orientation and the unprotected orientation upon impact with the present invention as part of a DASD.

FIG. 3 illustrates the keying feature with reinforcing members.

FIG. 4 is a partial section view of the DASD illustrating the shock rail laminated with metal or other smooth hard surface to render the rails relatively friction free.

DETAILED DESCRIPTION OF THE PREFERRED EMBODIMENT

Figure 1:
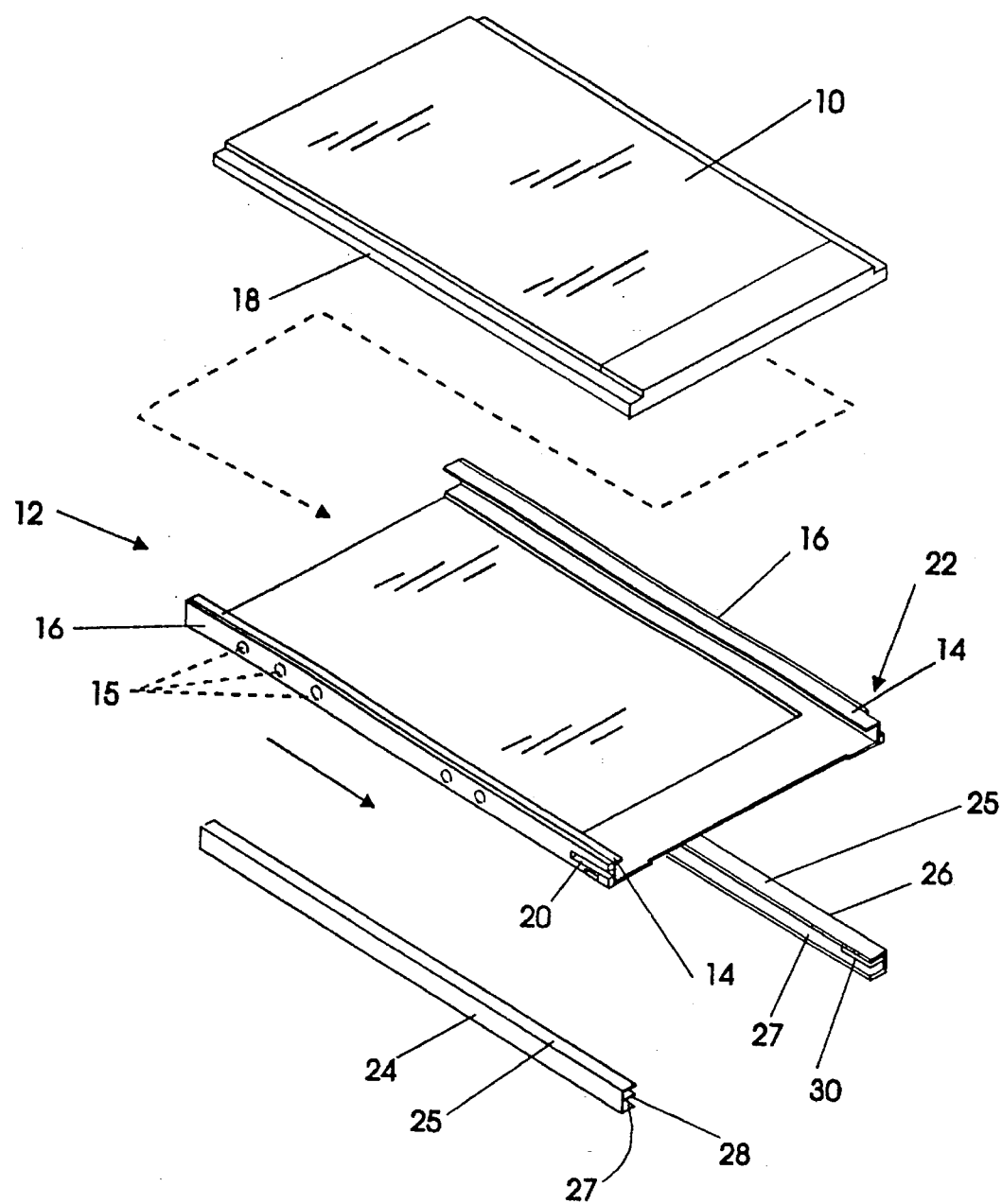
FIG. 1 is an exploded illustration of the DASD assembly with the DASD exploded out of the bottom cover.

Referring initially to FIG. 1, the PCMCIA DASD 10 is illustrated exploded out of its bottom cover 12. Bottom cover 12 is foraged of a thin sheet metal, such as stainless steel, by bending and stamping to form two inwardly opening side rails 14. Shock rails 16, formed of ribs of shock attenuating material, are mounted on the outwardly exposed surfaces of rails 14. The shock rails 16 may be adhered to the outwardly exposed surfaces of rails 14 by adhesives, vulcanization, or molding of the shock rails 16. If molding is used, the outwardly exposed surfaces of rails 14 may be provided with a plurality of small holes 15, or other surface irregularities, to accommodate some of the material of the shock rail, thereby in effect molding a plug or rivet (not shown) of the material into the holes 15, or surface irregularities, in order to retain shock rails 16 on the outwardly disposed surface of rails 14.

The bottom cover 12 encloses the bottom portion of DASD housing 10, and covers and contains an electronic printed circuit, not shown. The printed circuit provides the electronic circuitry function to the internal components of DASD 10.

The bottom cover 12 is assembled to the DASD 10 by sliding the flanges of rails 14 over correspondingly mating lips or rails 18 on the DASD 10.

Shock rails 16, on each side of the bottom cover 12, are provided with keyway 20 and 22. Keyway 20 is an open-ended slot formed by secondary ribs 32 of the shock absorbing material extending from the end of bottom cover 12 longitudinally along rail 14, and is formed within shock rail 16. An open-ended and open-sided keyway 22 (rather than a slot) is formed into the other shock rail 16. Both of these formations typically are formed during the molding operation which forms shock rails 16. The details of the keying are established by the PCMCIA standard, but any keying arrangement would suffice.

Shock rails 16, whenever assembled or romped on bottom cover 12 of DASD 10, then may be slid into the channels 24 and 26. Channel 24 is provided with a key 28 which is a centrally disposed web, or ridge, extending into the passageway of channel 24 which forms one of the guides for the shock rail 16 of DASD 10. Key 30 is disposed within channel 26, and is a blocking member adjacent the top flange 25 of channel 26 which forms the second guide for shock rail 16.

Referring now to FIG. 2, DASD 10, with a shock rail 16 on at least one edge surface thereof, is illustrated at an orientation representing the dividing line between the unprotected and the protected orientations for impact; angle 36 is typically approximately 15.8 degrees dictated by the form factor of the PCMCIA DASD as set forth by the PCMCIA standard. For an angle 36 greater than 15.8 degrees, the DASD 10 will be protected at least partially upon impact by the deformation of shock rail 16. For angles 36 having values less than 15.8 degrees, for example, the corner of the DASD 10 will impact significantly the hard surface 40 and potentially cause damage to the DASD 10.

Due to height restrictions on PCMCIA DASD's 10, it is not possible to completely cushion the DASD 10 and, therefore, some exposure to damage exists whenever the DASD 10 impacts surface 40 at an angle of less than the critical angle. The critical angle may vary slightly, but is approximately 15.8 degrees whenever the DASD and the shock rail 16 are fabricated in accordance with PCMCIA specifications. The angle of 15.8 degrees is determined by the specified height if the DASD 10 and the specified height or thickness of the rails 16 in accord with the PCMCIA standard.

By using a very compliant and deformable material in the shock rail 16 for maximum shock attenuation, as illustrated in FIG. 3, the shock rail 16, due to close proximity to the end of the bottom cover 12 and rail 14, is very easily deformed. If the DASD 10 illustrated in FIG. 1 is incorrectly inserted into the guide channels 24, 26 of FIG. 1, then key 30 will engage bottom wall 32 of keyway 20, and cause deformation of the bottom wall 32 and the end of the shock rail 16. This engagement by conventional hard metal rails is sufficient to prevent the improper engagement of the DASD 10 of FIG. 1 in the PCMCIA slot of the computer (not shown).

To regain the effectiveness of the keying arrangement found in channels 24 and 26 of FIG. 1, the side rail 14 of bottom cover 12 is formed, as illustrated in FIG. 3, to create two reinforcing members 33 and 34. Reinforcing members 33 and 34 are pierced and bent to extend from the structure of rail 14, and form a gap 35 between the flanged ends of reinforcing members 33 and 34. The gap 35 will permit the entry of key 28, as illustrated in FIG. 1. However, reinforcing member 34, when inverted and inserted into channel 26, will engage key 30, and not permit the full insertion of the bottom cover 12 and the associated DASD 10 into full engagement with the connectors within the PCMCIA slot (not shown). Reinforcing members 33, 34 have substantial rigidity in the direction of insertion, as represented by arrow 37, due to the planes of the material forming members 33, 34 laying parallel to the direction of the insertion, arrow 37.

A reinforcing member similar to reinforcing member 34 with a flanged end facing generally upward may extend underneath and upward to keyway 22. The particular flange member, or reinforcing member, is not shown inasmuch as it is fabricated completely analogous to reinforcing member 34 only on the opposite side of bottom cover 12.

A further improvement is illustrated in FIG. 4. The use of a very soft resilient cushioning material, such as urethane, in the shock rail 16, as illustrated in FIG. 4, may be significantly enhanced with respect to its frictional characteristics by laminating thin metal sheets 42, 44 on the top 50 and bottom 52 surfaces of shock rail 16. Since shock rail 16 and particularly thin metal layers 42, 44 are disposed within the flanges 25, 27 of channels 24, 26, as illustrated in FIG. 1, the surfaces 50, 52 of the shock rail 16 are engaged with surfaces of flanges 25, 27.

In FIG. 4, a portion incorporating channel 24 is illustrated. The metal surfaced shock rail 16 and thin metal layers 42, 44, significantly reduce the friction between shock rail 16 and channel 24. The material used in the shock rail 16 inherently has a very high coefficient of friction, and can be sticky or tacky; accordingly, shock rail 16 may be difficult to insert and remove from the channel 24. By cladding the top and bottom of shock rail 16 with material having a much lower coefficient of friction, the DASD 10 may be inserted, or removed, with significantly less effort from its guide channels 24, 26. Since the forces for insertion are significantly reduced by reducing the coefficient of friction of the shock rail 16 surfaces, the operator will be able to detect the resistance offered by reinforcing members 33, 34 when insertion of the DASD 10 in an inverted position is attempted. Whenever resistance to insertion is incurred, the operator will be more aware of it than if a material, such as urethane, having a very high coefficient of friction is directly exposed to the interior surfaces of the flanges 25, 27 of guide channels 24, 26, as illustrated in FIG. 1.

Figure 5:
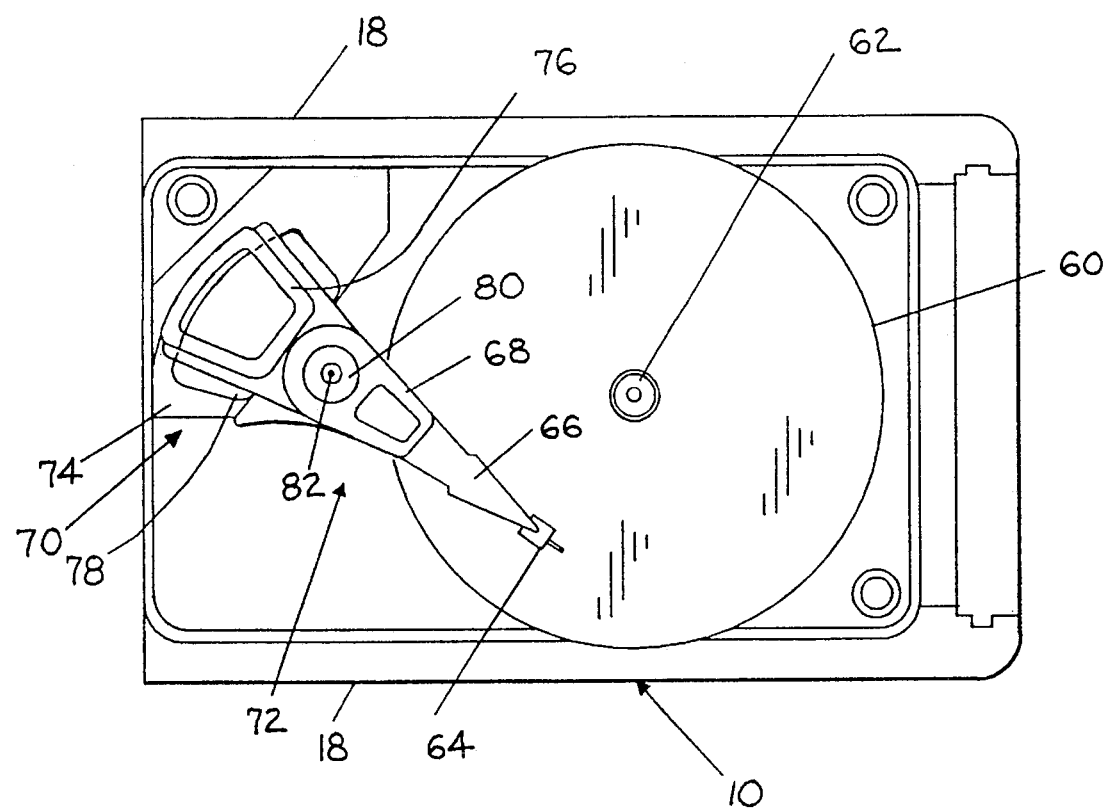
FIG. 5 is a bottom view of the DASD with the bottom cover removed.

Referring now to FIG. 5, a bottom view of DASD 10 is illustrated with the bottom cover 12 removed. A spin motor (not shown) is connected to a data storage disk 60 by a hub 62 to rotate data storage disk 60 at high speed. A transducer head 64 for recording data to and/or reproducing data from data storage disk 60 is mounted on a load beam 66, which is attached to an arm 68 of an actuator motor 70 of an actuator 72. Actuator motor 70 includes a pole piece 74 and a similar pole piece (not shown) disposed over opposite sides of a coil 76 attached to arm 68, and in cooperation with a magnet 78, function to drive actuator 72 about bearing 80 and pivot axis 82. Consequently, actuator 72 moves transducer head 64 relative to data storage disk 60 so that transducer head 64 moves in an arc, which extends substantially along a radius of data storage disk 60.

It can be seen that the shock rails 16, being an easily compressible material, will attenuate any impact forces encountered when the DASD 10 is dropped on a surface, or whenever the channels 24, 26, as illustrated in FIG. 1, act to restrain the movement of DASD 10 upon excessively rough handling of the computer within which DASD 10 is mounted.

All around protection of the DASD 10 is not possible while still meeting the requirements of the PCMCIA standard; significantly enhanced protection may be provided to the DASD 10, as is described and illustrated herein.

It will be recognized that other modifications and changes may be made to further enhance the shock capacity and the insertion and removal of the DASD 10. For example, the interior surfaces of the flanges 25, 27 of guide channels 24, 26 could be coated with a low friction material, such as polytetrafluoroethylene or other similar fluorocarbon low friction material. Alternatively, the exterior surfaces of the metal layers 40, 42 could be coated with such a low friction or anti-friction material.

It will be apparent to one of skill in the art that other minor modifications may be made to the subject invention without departing from the scope of the invention as defined by the appended claims.

What is claimed is:

1. A disk drive mounting for shock absorption comprising:

a disk drive having a housing;

a first rail and a second rail disposed along parallel sides of said housing and being receivable in first and second guide slots, respectively, said first rail comprising a first resilient, shock absorbing rib attached to said housing, said second rail comprising a second resilient, shock absorbing rib attached to said housing, said first and second ribs having outer surfaces;

said first rib configured to form a keyway extending from one end of said housing toward the other end of said housing, said first rib extending to a point proximate said other end of said housing, said keyway being narrower than said first rib for insertion of a first key extending from the first guide slot;

said disk drive housing comprising at least a pair of reinforcement extensions extending from said first rail positioned adjacent to said one end of said housing and contiguous with at least a portion of said keyway, said extensions partially circumscribing said outer surfaces of said first rib on top of and below the keyway, respectively, and forming a gap therebetween coextensive with said keyway so that the first key passes therebetween; and said reinforcement extensions preventing deformation of said first rib in an attempt to improperly insert said disk drive in the guide slots.

2. The disk drive mounting of claim 1 wherein said first rib includes first and second resilient, shock absorbing secondary ribs on opposite sides of said keyway, respectively, to form said keyway and said secondary ribs extending from said first rib.

3. The disk drive mounting of claim 2 wherein said second rib comprises a region of reduced width formed by a single resilient, shock absorbing secondary rib extending from and aligned with one side of said second rib and said region is disposed proximate one end of said second rail, and the second guide slot comprises a second key extending into the path of said second rib and aligned with an area adjacent to said single secondary rib, whereby the first and second keys, one of said first and second secondary ribs, and said region of reduced width prevent complete insertion of said disk drive into the guide slots in any except one defined position.

4. The disk drive mounting of claim 1 wherein said first and second ribs further comprise smooth, low friction regions on top and bottom surfaces of said first and second ribs whereby insertion and removal friction between said first and second ribs and the guide slots is reduced.

5. The disk drive mounting of claim 4 wherein said first and second ribs further comprise plates bonded to said top and bottom surfaces of said first and second ribs, thereby forming said low friction regions.

6. The disk drive mounting of claim 1 wherein said first and second ribs have a height less than said disk drive.

7. A disk drive mounting as defined in claim 1, wherein said reinforcement extensions are flush with said outer surfaces of said first rib.

8. A disk drive mounting as defined in claim 7, wherein:
said extensions each define a plane; and
said plane of each of said extensions is parallel to the direction of insertion into said first guide slot.

9. A direct access storage device for insertion into first and second guide slots, comprising:
a data storage disk mounted for rotation about an axis;
a transducer head;
an actuator, including an actuator motor, operatively connected to said transducer head for moving said transducer head relative to said data storage disk;
a housing;
a first rail and a second rail disposed along parallel sides of said housing and being receivable in the first and second guide slots, respectively, said first rail comprising a first resilient, shock absorbing rib attached to said housing, said second rail comprising a second resilient, shock absorbing rib attached to said housing, said first and second ribs having outer surfaces;
said first rib configured to form a keyway extending from one end of said housing toward the other end of said housing, said keyway being narrower than said first rib for insertion of a first key extending from the first guide slot;
said housing comprising a reinforcement extension extending from said first rail on top of or below the keyway and partially circumscribing said outer surfaces of said first rib and being adjacent to and contiguous with at least a portion of said keyway; and
said reinforcement extension preventing deformation of said first rib in an attempt to improperly insert said direct access storage device in the guide slots.

10. The direct access storage device of claim 9 wherein said first rib includes first and second resilient, shock absorbing secondary ribs on opposite sides of said keyway, respectively, to form said keyway and said secondary ribs extending from said first rib.

11. The direct access storage device of claim 10 wherein said second rib comprises a region of reduced width formed by a single resilient, shock absorbing secondary rib extending from and aligned with one side of said second rib and said region is disposed proximate one end of said second rail, and the second guide slot comprises a second key extending into the path of said second rib and aligned with an area adjacent to said single secondary rib, whereby the first and second keys, one of said first and second secondary ribs, and said region of reduced width prevent complete insertion of said direct access storage device into the guide slots in any except one defined position.

12. The direct access storage device of claim 9 wherein said first and second ribs further comprise smooth, low friction regions on top and bottom surfaces of said first and second ribs whereby insertion and removal friction between said first and second ribs and the guide slots is reduced.

13. The direct access storage device of claim 12 wherein said first and second ribs further comprise plates bonded to said top and bottom surfaces of said first and second ribs, thereby forming said low friction regions.

14. The direct access storage device of claim 9 wherein said first and second ribs have a height less than said direct access storage device.

15. A disk drive mounting as defined in claim 9, wherein said reinforcement extension is flush with said outer surfaces of said first rib.

16. A disk drive mounting as defined in claim 15, wherein:
said extension defines a plane; and
the plane of said extension is parallel to the direction of insertion into said first guide slot.

* * * * *